Figure 17:
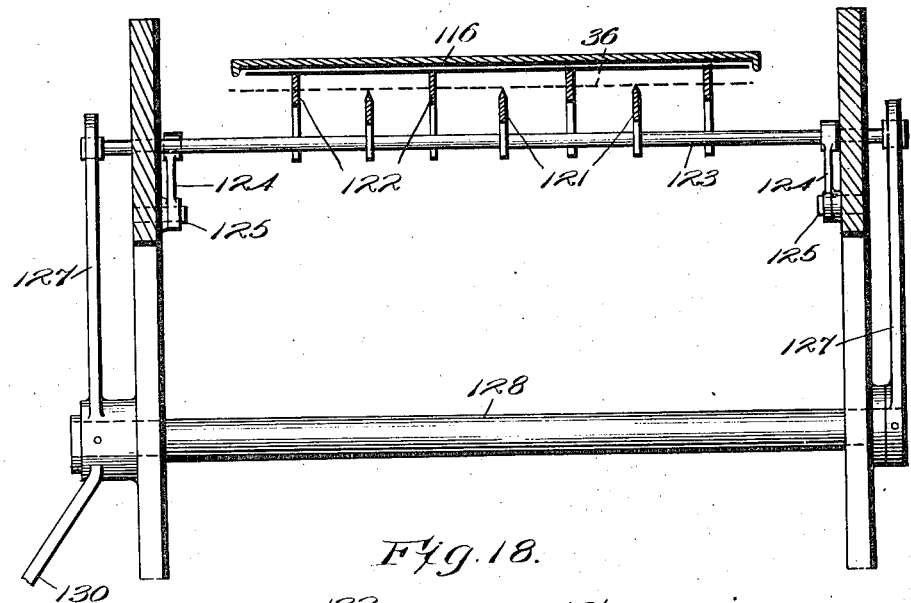

G. W. BEADLE.
MACHINE FOR MAKING PAPER CARTONS.
APPLICATION FILED JAN. 24, 1912.
1,134,808.
Patented Apr. 6, 1915.
18 SHEETS—SHEET 1.
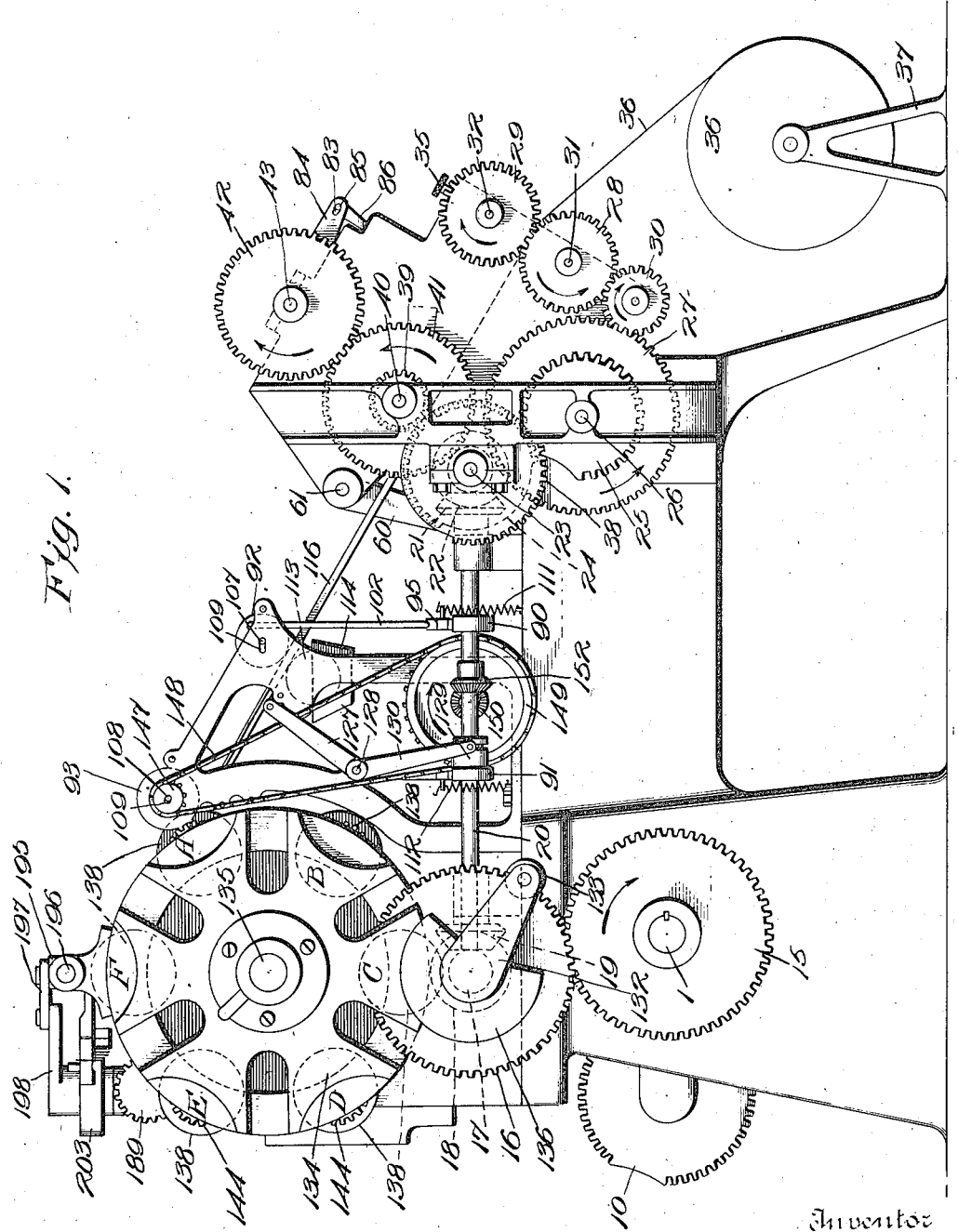

G. W. BEADLE.
MACHINE FOR MAKING PAPER CARTONS.
APPLICATION FILED JAN. 24, 1912.
1,134,808.
Patented Apr. 6, 1915.
18 SHEETS—SHEET 2.
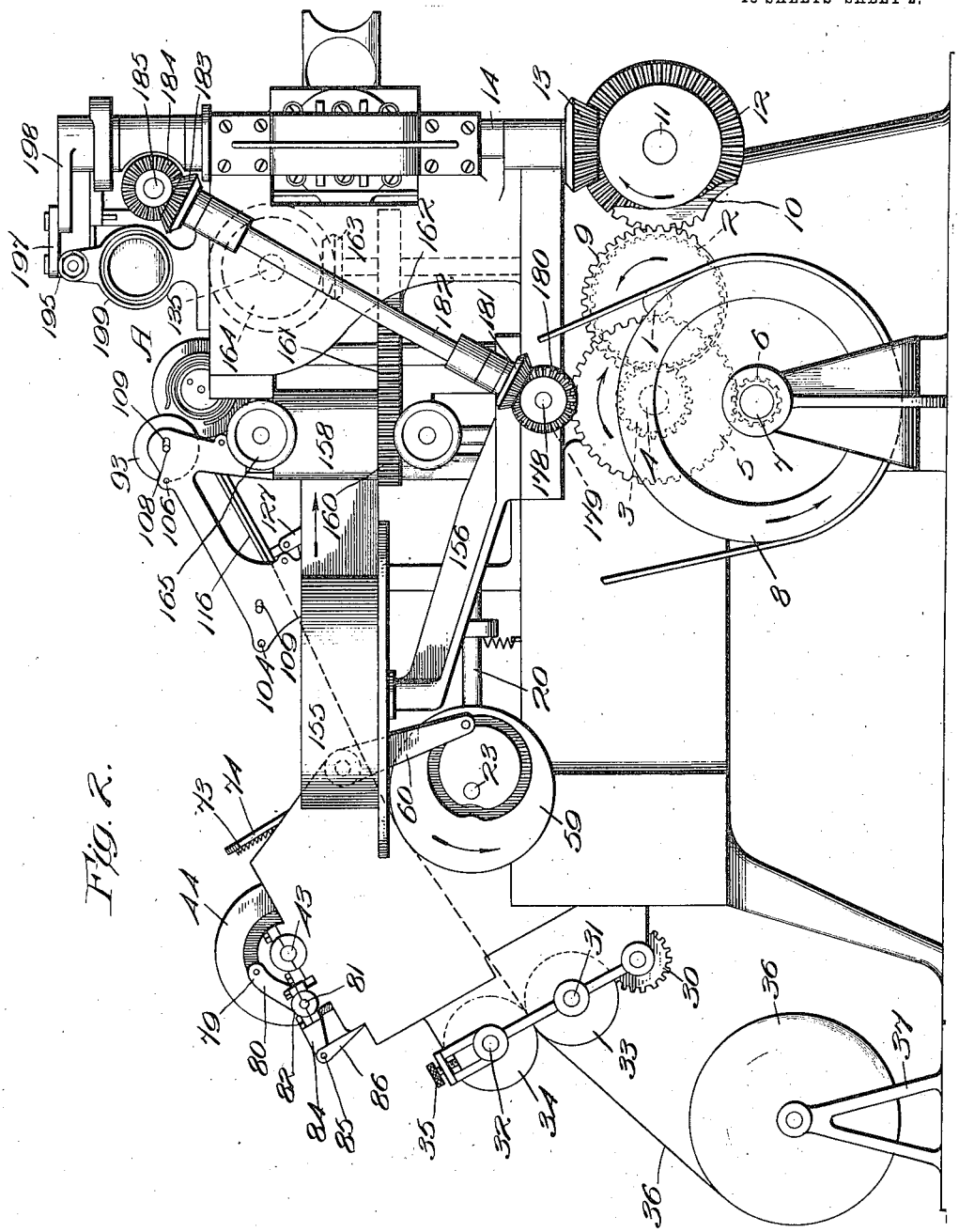

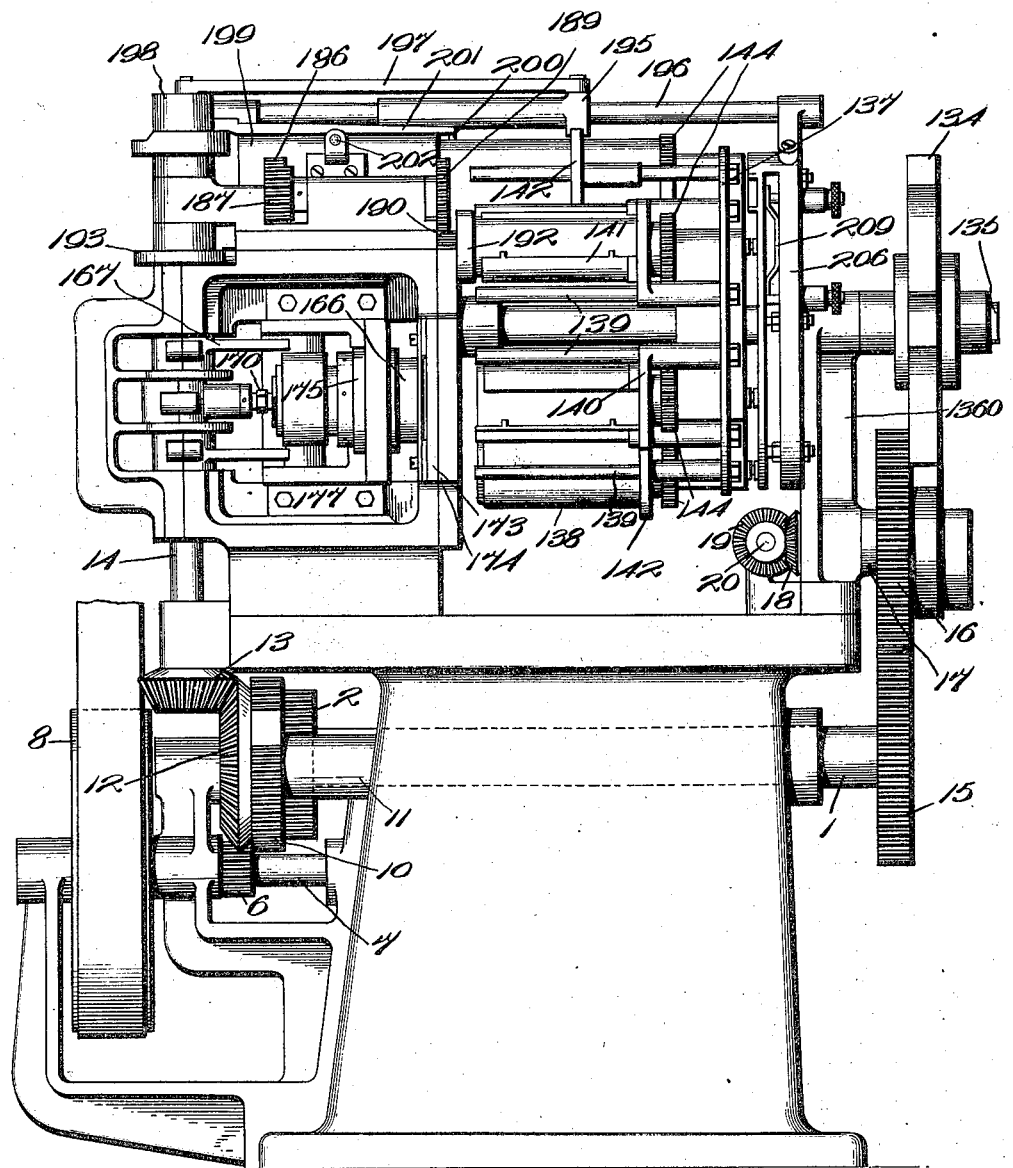

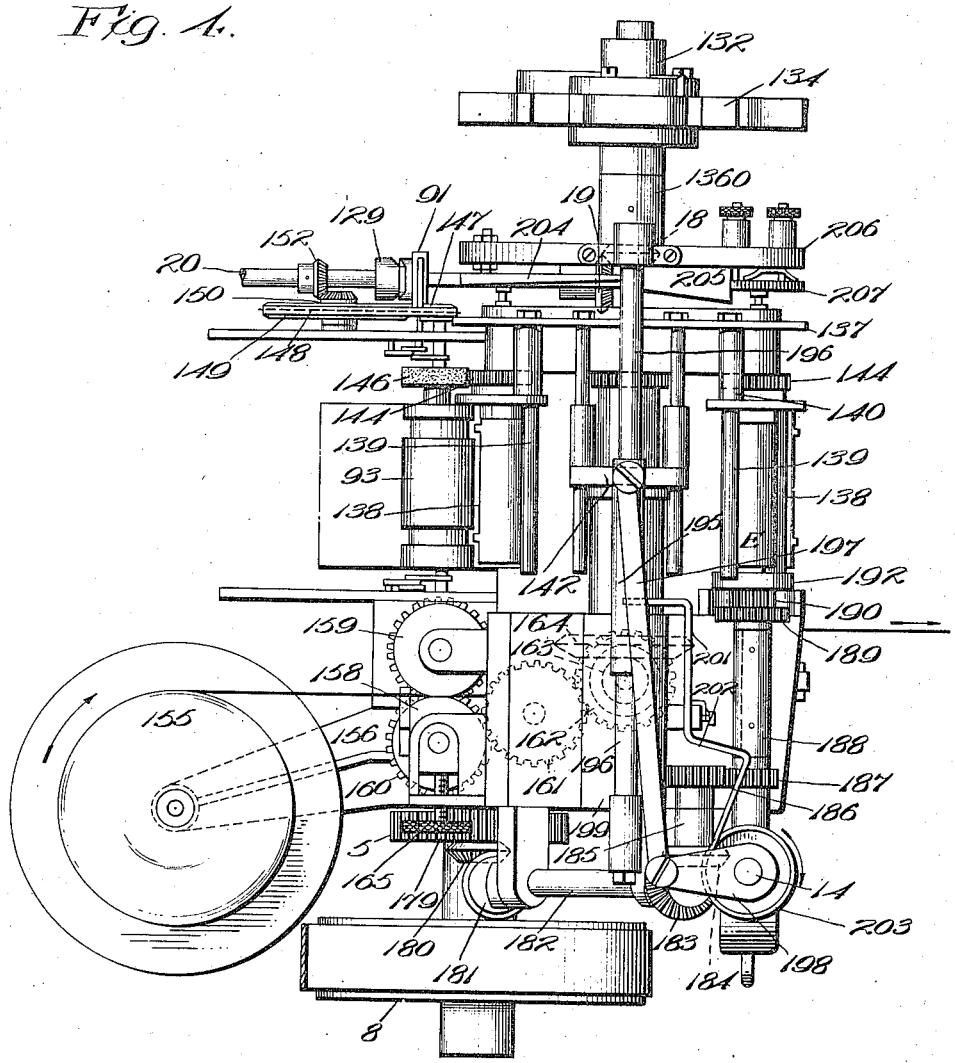

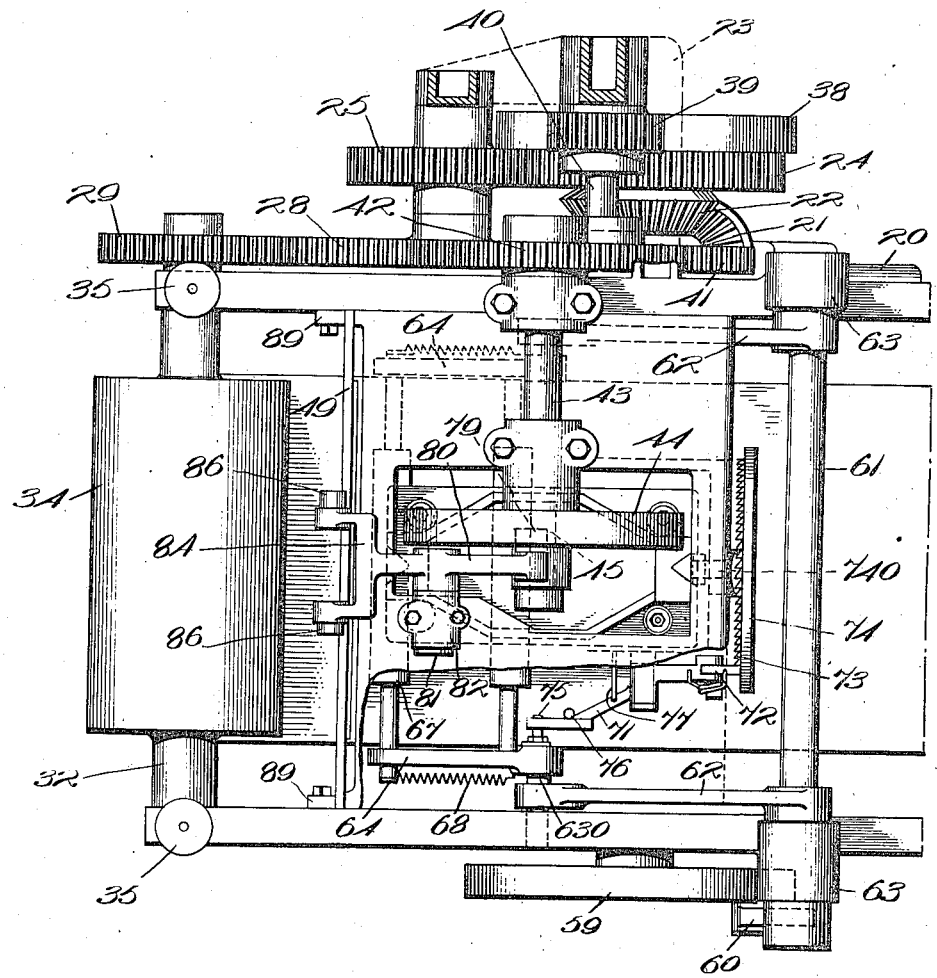

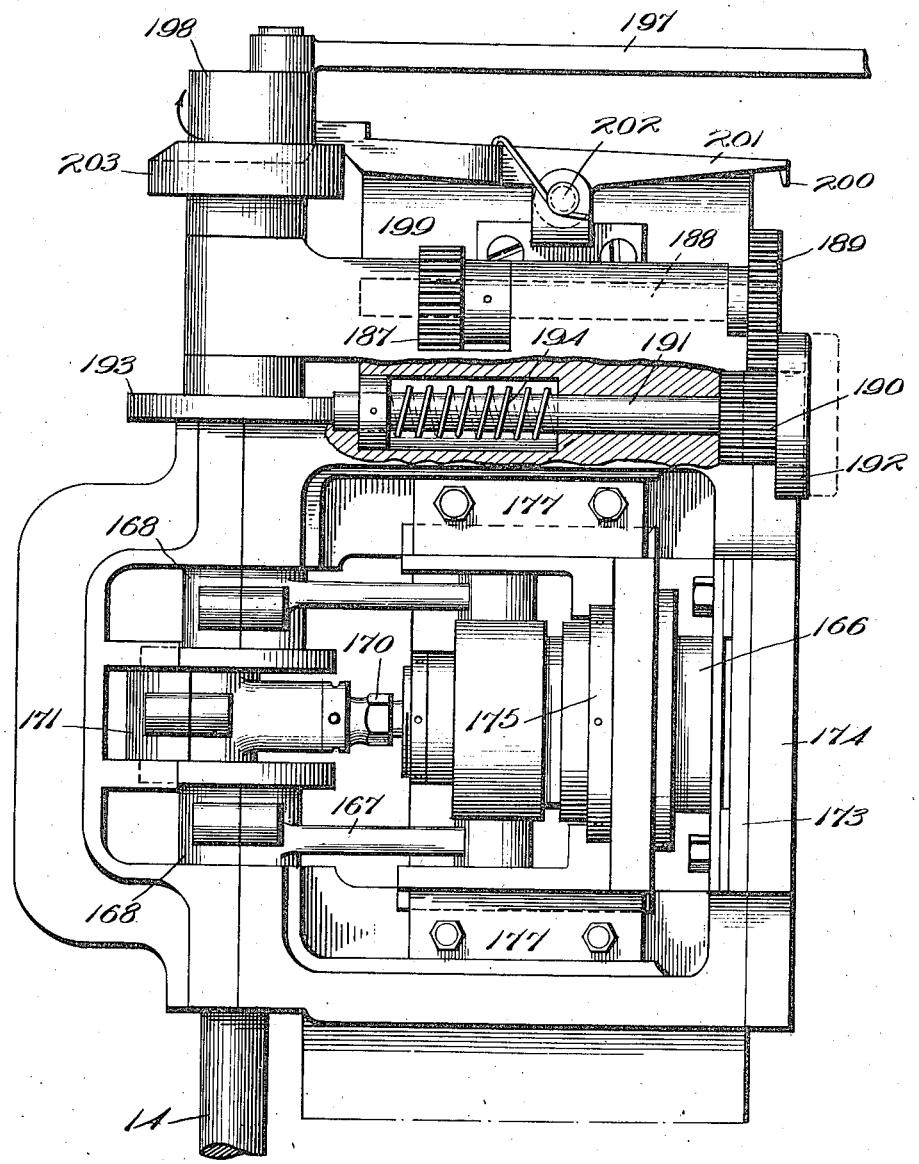

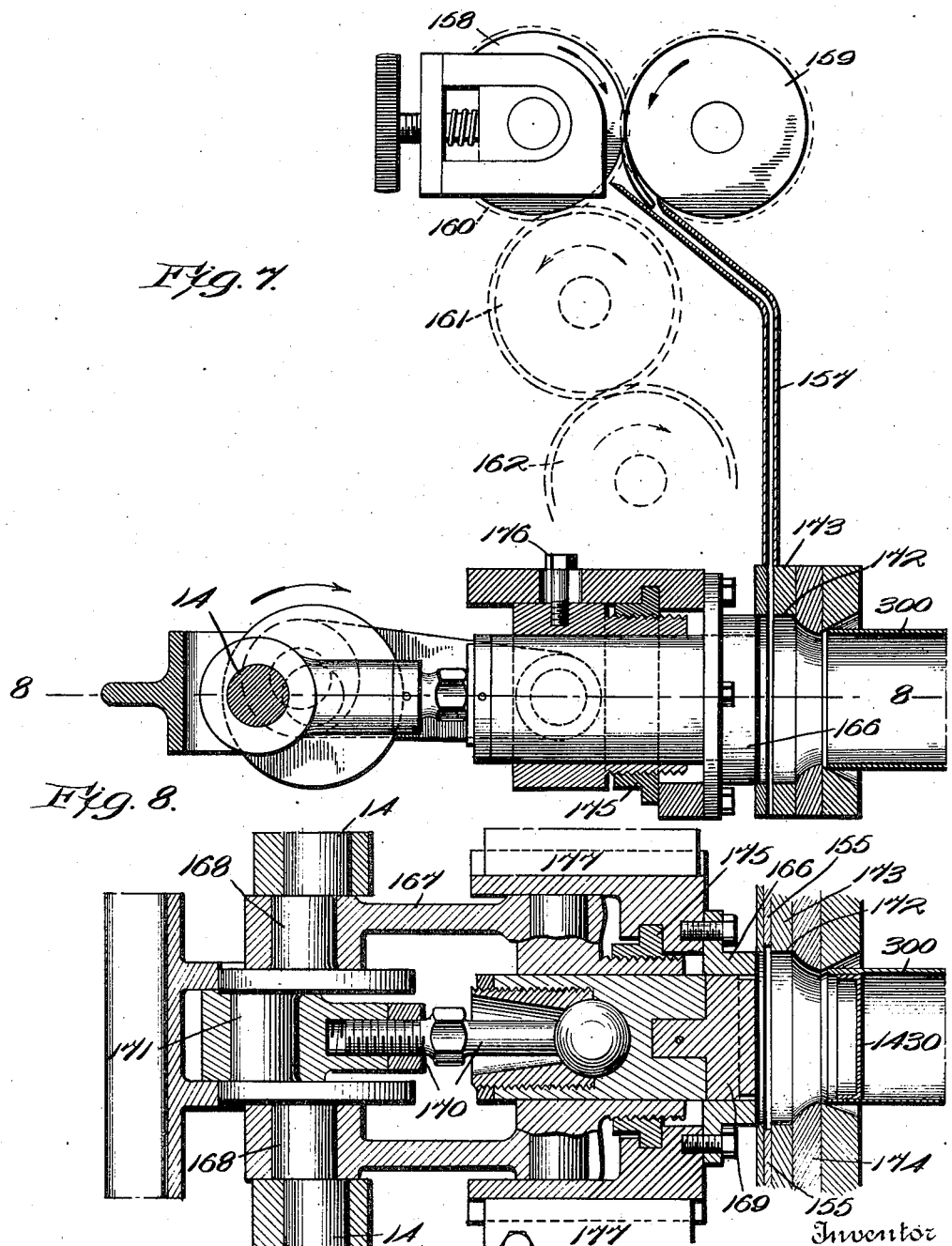

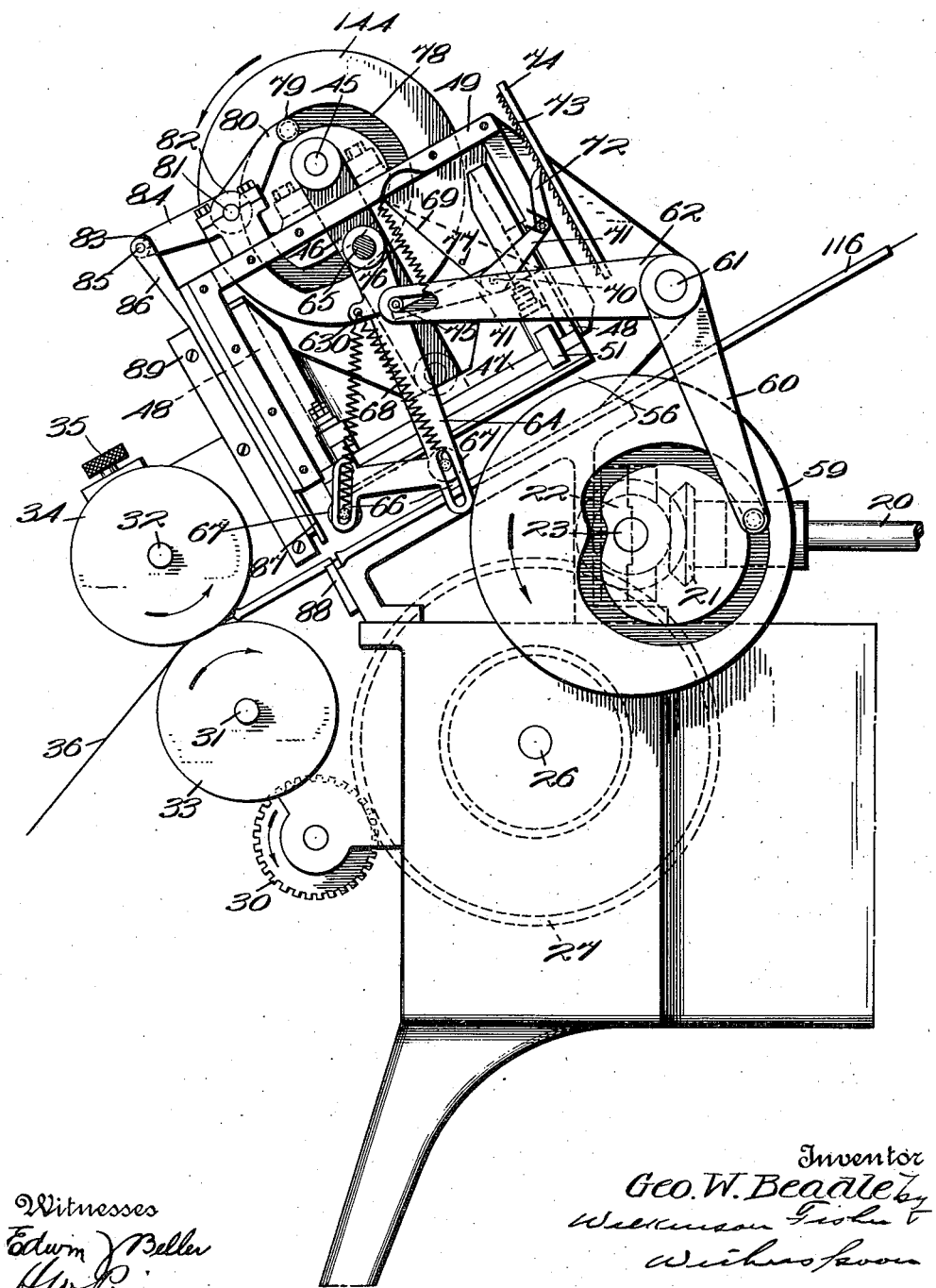

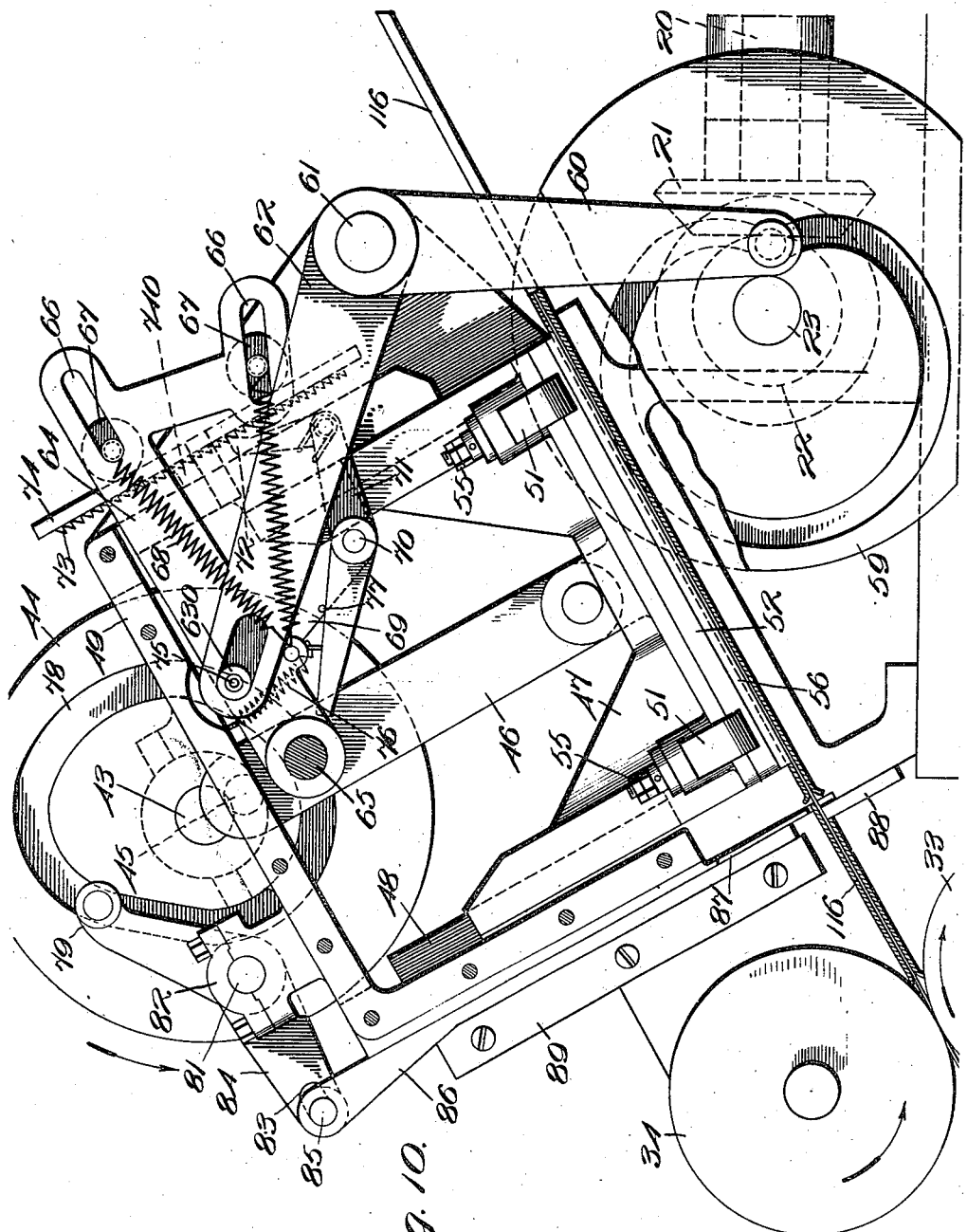

G. W. BEADLE.
MACHINE FOR MAKING PAPER CARTONS.
APPLICATION FILED JAN. 24, 1912.
1,134,808.
Patented Apr. 6, 1915.
18 SHEETS—SHEET 10.
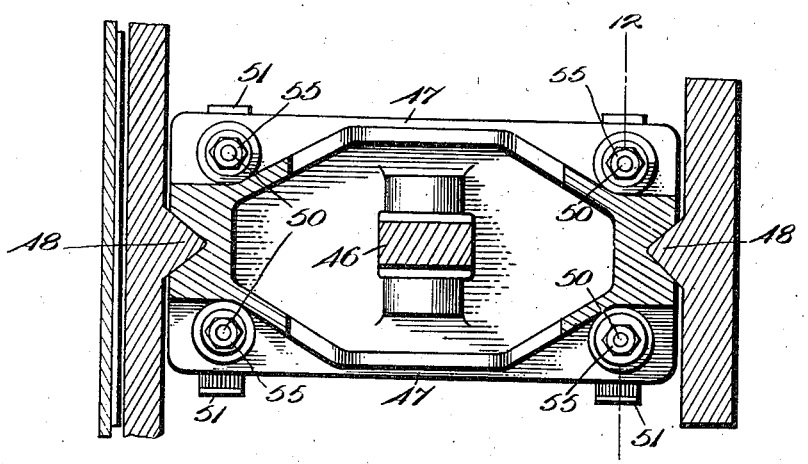
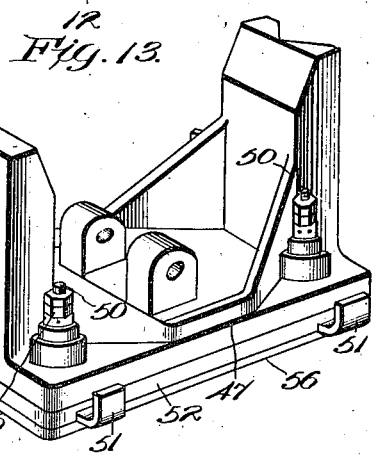
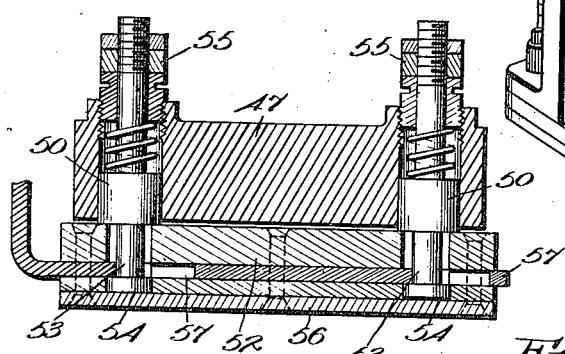
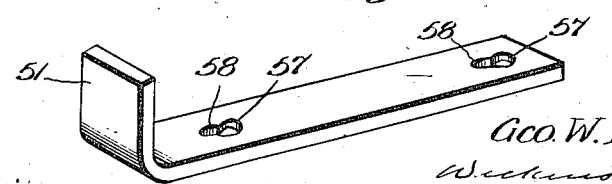

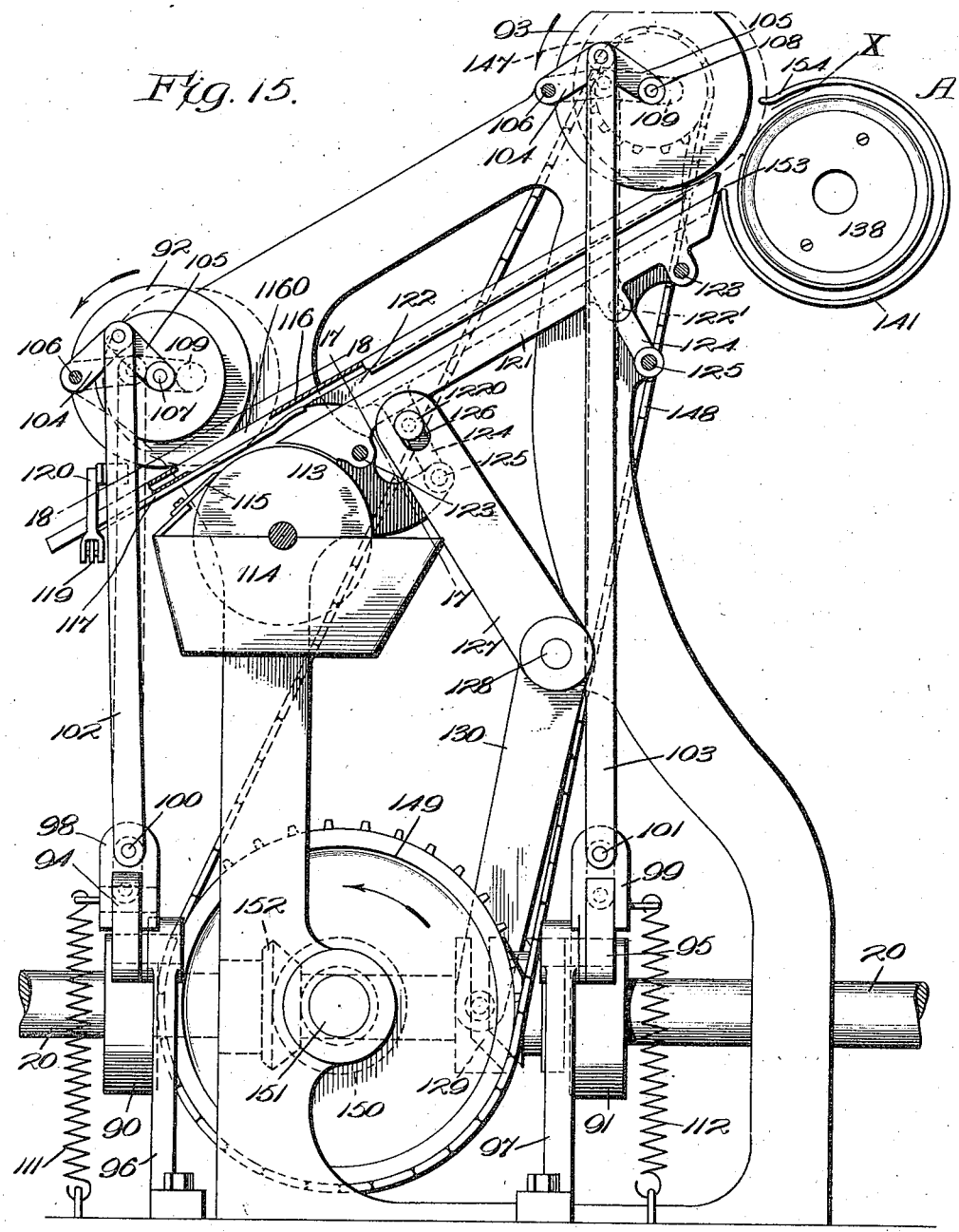

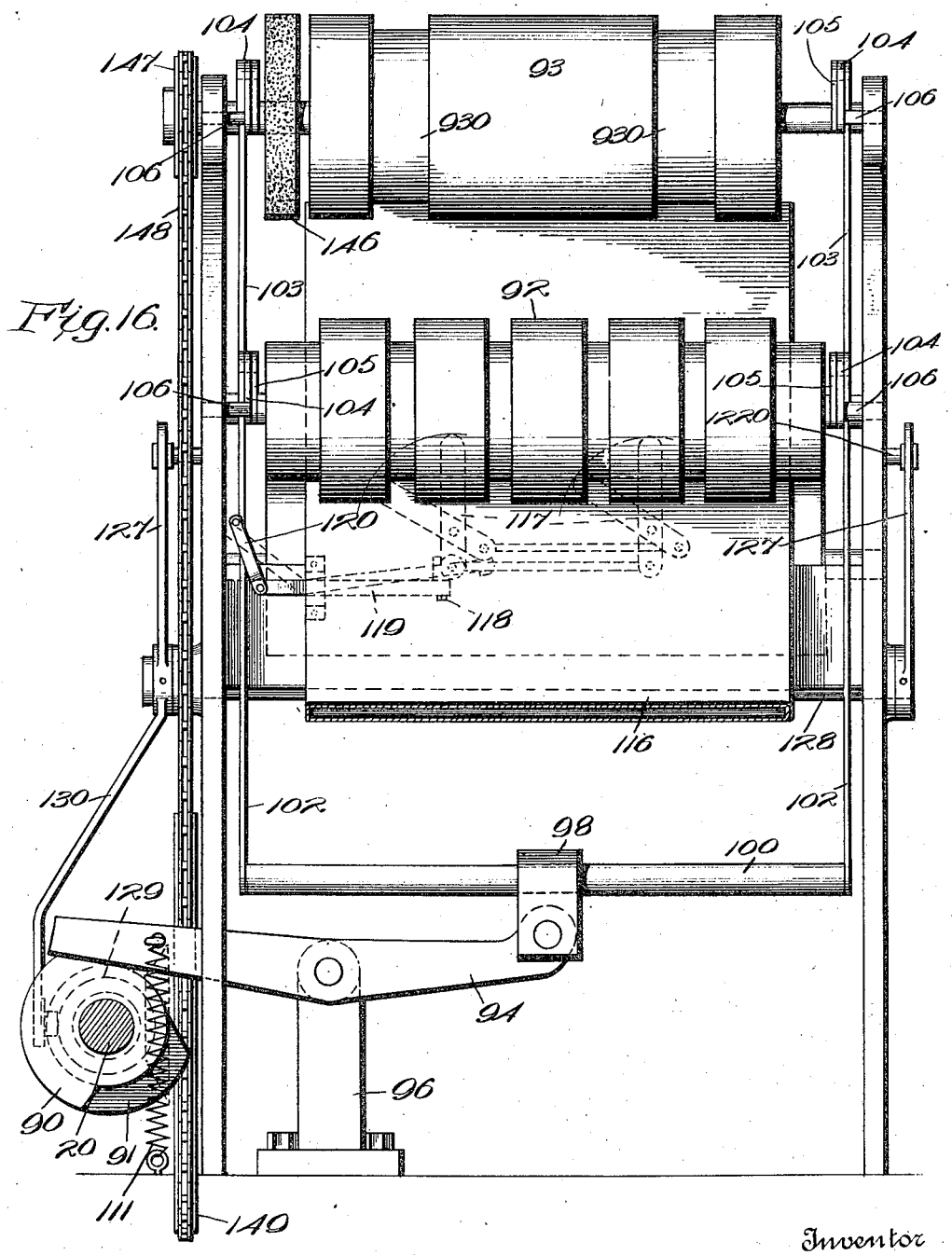

G. W. BEADLE.
MACHINE FOR MAKING PAPER CARTONS.
APPLICATION FILED JAN. 24, 1912.

1,134,808.

Patented Apr. 6, 1915.
18 SHEETS—SHEET 13.

Witnesses
Oscar A. Heluis
Edwin J. Beller

Inventor
Geo. W. Beadle

Attorneys

G. W. BEADLE.
MACHINE FOR MAKING PAPER CARTONS.
APPLICATION FILED JAN. 24, 1912.

1,134,808.

Patented Apr. 6, 1915.
18 SHEETS—SHEET 14.

Witnesses
Edwin J. Beller
H. W. Primm

Inventor
Geo. W. Beadle by
Wilkinson Fisher &
Witherspoon
Attorneys

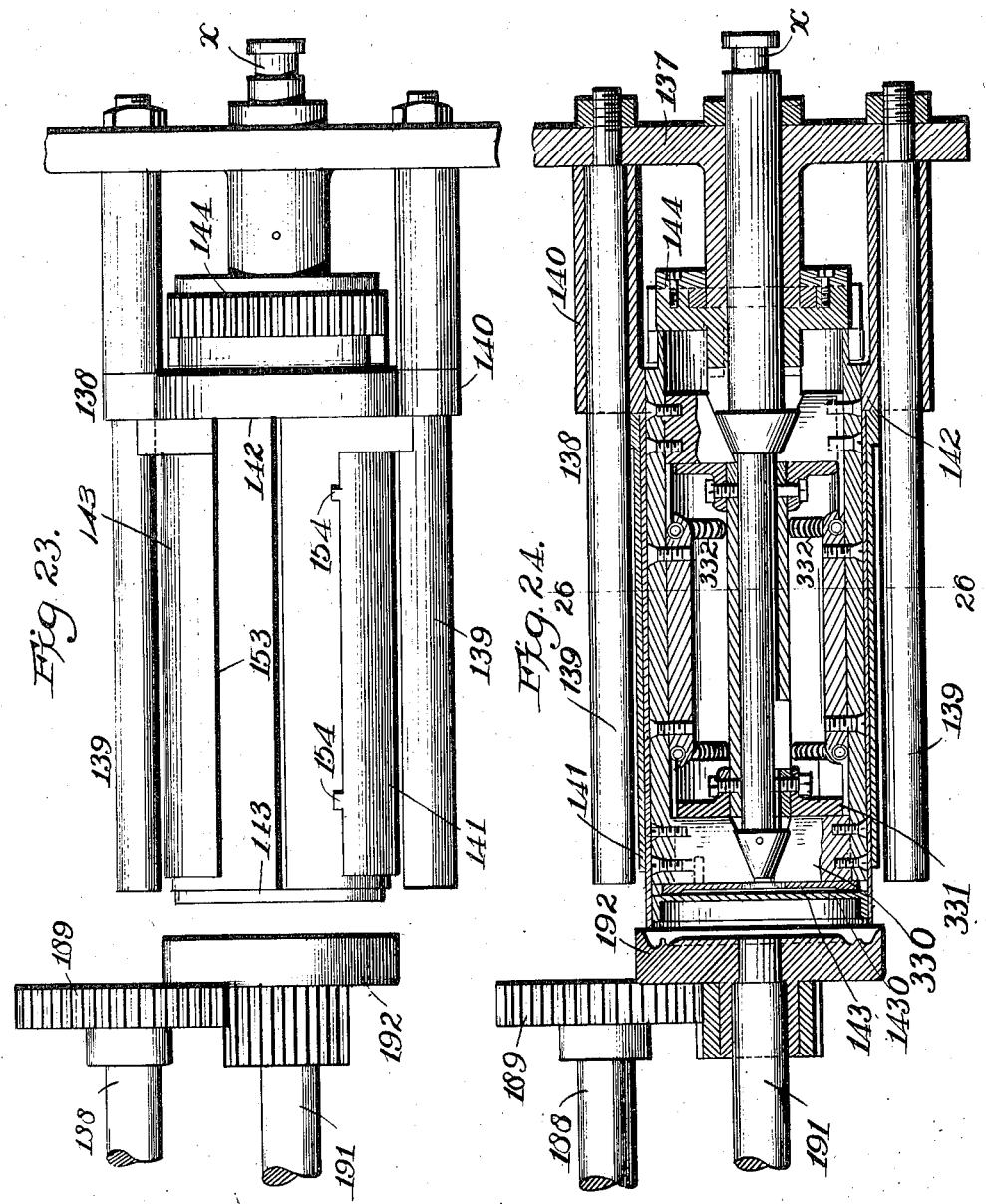

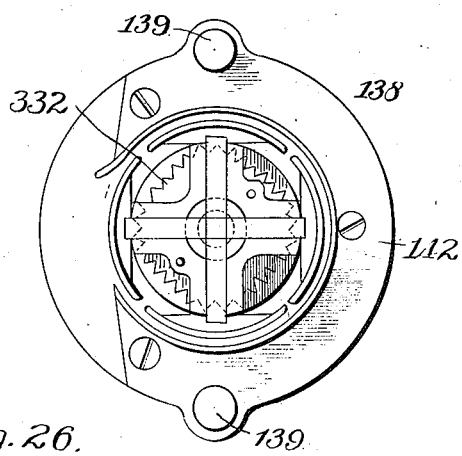
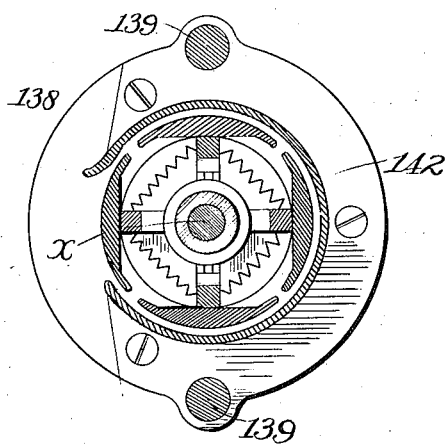
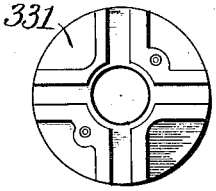
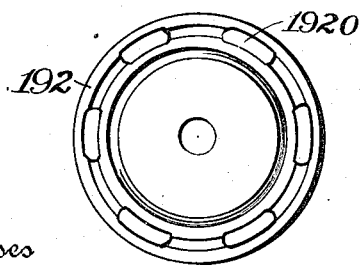
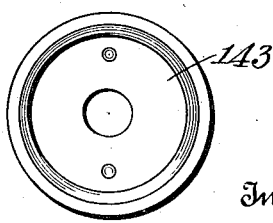

G. W. BEADLE.
MACHINE FOR MAKING PAPER CARTONS.
APPLICATION FILED JAN. 24, 1912.
1,134,808.
Patented Apr. 6, 1915.
18 SHEETS—SHEET 17.
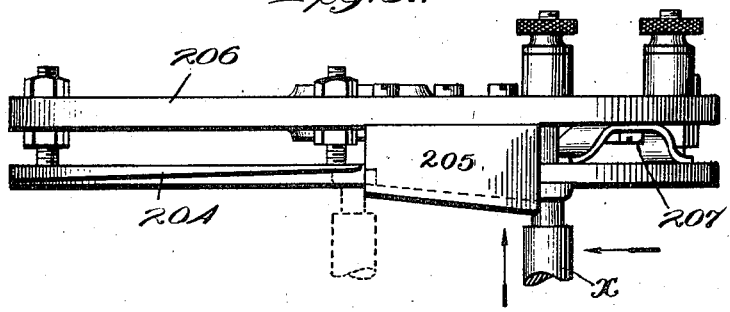
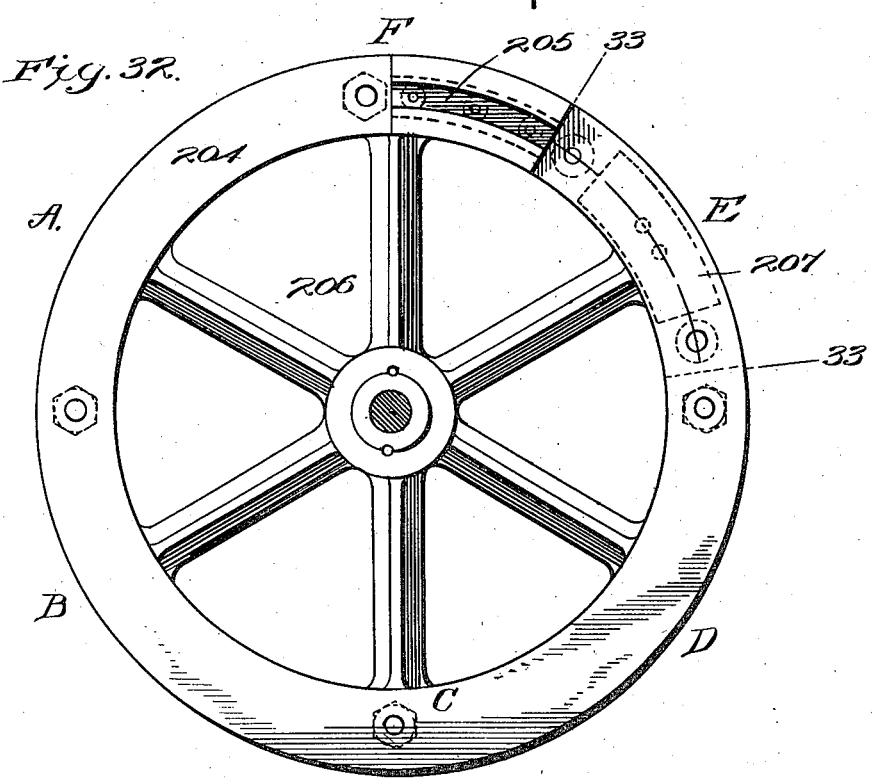
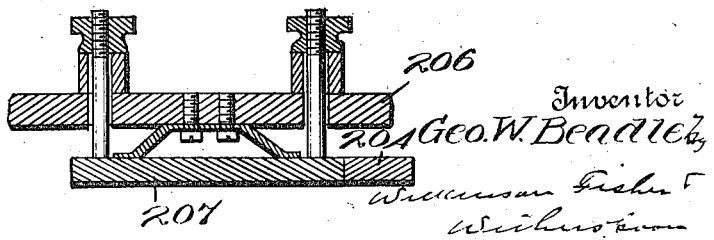

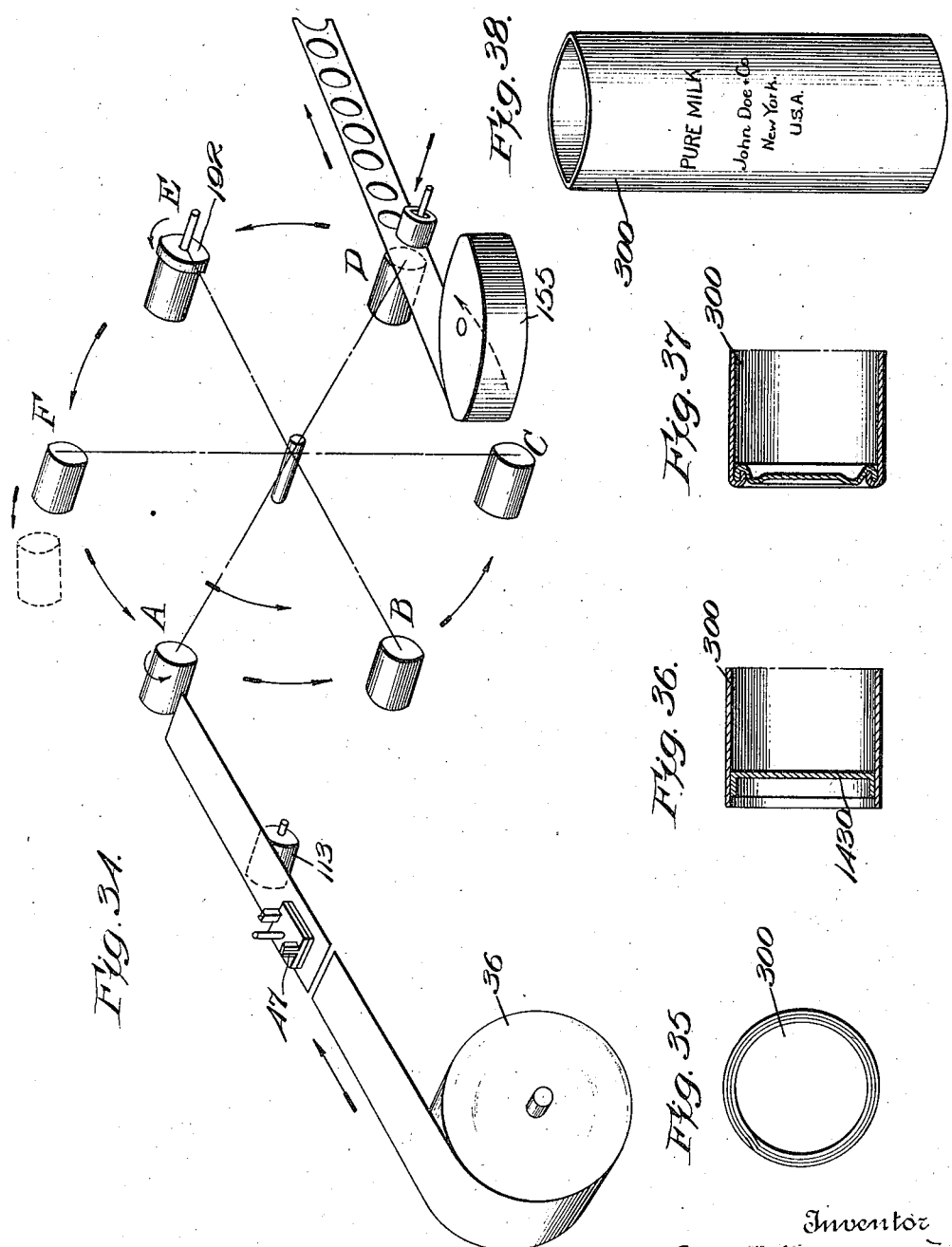

UNITED STATES PATENT OFFICE.

GEORGE W. BEADLE, OF BAYONNE, NEW JERSEY, ASSIGNOR TO SINGLE SERVICE PACKAGE CORPORATION OF AMERICA, OF NEW YORK, N. Y., A CORPORATION OF NEW JERSEY.

MACHINE FOR MAKING PAPER CARTONS.

1,134,808.    Specification of Letters Patent.    Patented Apr. 6, 1915.

Original application filed August 2, 1911, Serial No. 641,916. Divided and this application filed January 24, 1912. Serial No. 673,084.

*To all whom it may concern:*

Be it known that I, GEORGE W. BEADLE, a citizen of the United States, residing at Bayonne, in the county of Hudson and State of New Jersey, have invented certain new and useful Improvements in Machines for Making Paper Cartons; and I do hereby declare the following to be a full, clear, and exact description of the invention, such as will enable others skilled in the art to which it appertains to make and use the same.

This invention relates to the manufacture of paper cartons or vessels, and has for its object to produce a machine especially adapted to close the ends of tubes which have been formed by the mechanism described and claimed in my copending application, Serial No. 641,916, filed August 2, 1911 and entitled Paper carton making machine, of which this is a division.

Heretofore the various steps required to make paper cartons have been performed on several separate and distinct machines, such for example, as a gluing machine for applying an adhesive to the paper strips, a tube winder for winding the strips into tubes, a tube cutter for cutting the tubes in proper lengths, a bottom forming machine for making the end closures of the tube, and a spinning machine for securing said closures to the tube. But by this invention and that made the subject of my said application above these various operations are greatly lessened and the cost of the product correspondingly decreased. That is to say, in order to reap the full benefit of the invention made the subject of this application it should be associated with the mechanism made the subject of my said former application substantially in the manner illustrated in the drawings, and whereby a tube is convolutely wound from a strip of paper so tightly on a mandrel that it may be immediately subjected to a crimping and closing action without dislodging the same, and then through appropriate mechanism immediately discharged from the machine so that all the operations beginning with the original paper strip and ending with the finished carton are continuous, certain and rapid. Further, in order to perform with the maximum economy these continuous operations it is desirable to operate the tube forming and the tube closing mechanisms from the same source of power, and to build the two mechanisms into one machine as illustrated. In order, therefore, that the machine as an entirety may be fully understood and the exact relation of the tube closing to the tube forming mechanism may be rendered clear, I have illustrated both mechanisms herein.

Figure 18:
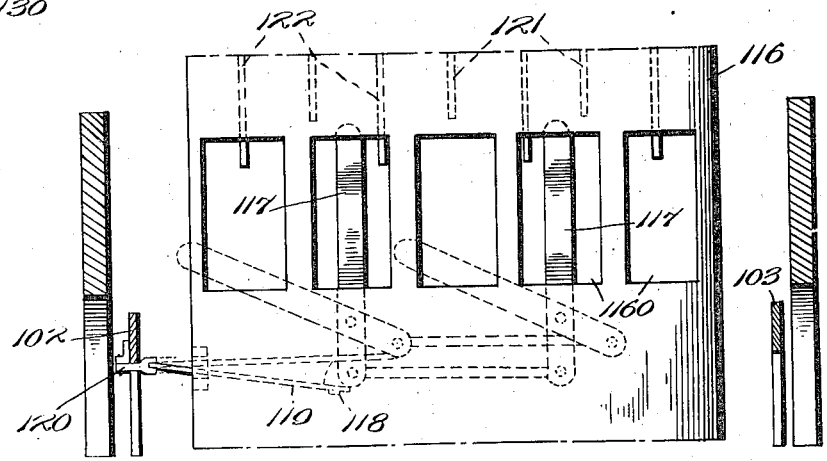
Figure 19:
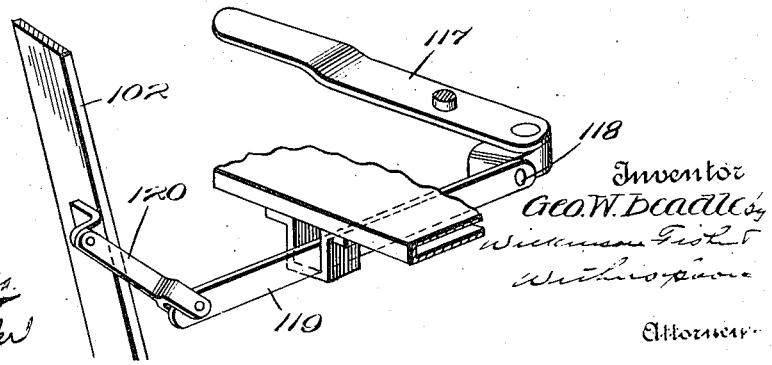
Figure 20:
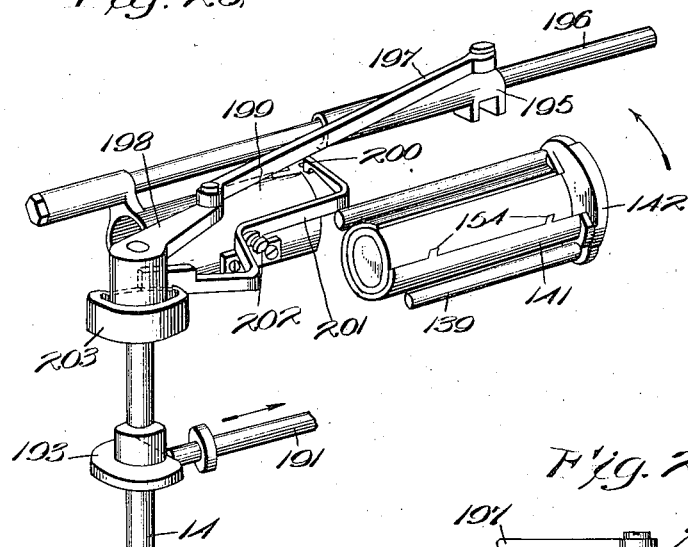
Figure 21:
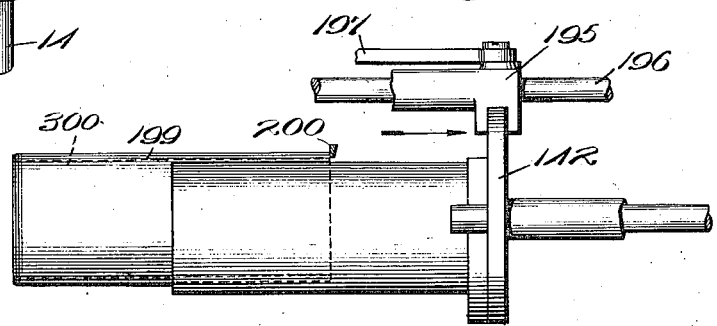
Figure 22:
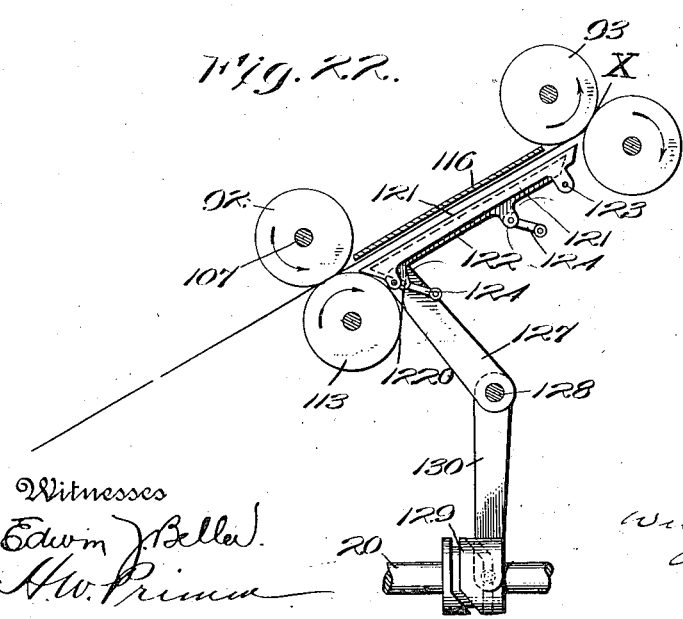

Referring to said drawings forming a part of this specification in which like numerals designate like parts in all the views:—Figure 1 is a side elevational view of the right hand side of the machine; Fig. 2 is a side elevational view of the left hand side of the machine; Fig. 3 is a front elevational view; Fig. 4 is a plan view of the carton forming end of the machine; Fig. 5 is a plan view of the printing and cutting mechanism; Fig. 6 is an enlarged detail front view of the bottom forming and spinning mechanism; Fig. 7 is an enlarged horizontal sectional view of the forming punch and die, and the paper feed; Fig. 8 is a sectional view taken on the line 8—8 of Fig. 7 and showing the bottom punched, formed, and inserted in the carton ready for spinning; Fig. 9 is a side elevational view of one end of the machine showing the printing and cutting mechanism with the side frame removed for the sake of clearness; Fig. 10 is an enlarged side elevational view similar to Fig. 9 but showing the parts in their relative position during the act of printing; Fig. 11 is a horizontal sectional view showing the type frame and guides; Fig. 12 is a cross sectional view taken on the line 12—12 of Fig. 11; Fig. 13 is a detail perspective view of the printing frame; Fig. 14 is a detail perspective view of one of the type clamping slides; Fig. 15 is a side elevational view of the gluing and winding mechanism with the side frame removed, and also showing the winding roll drive and a mandrel in winding position; Fig. 16 is an end elevation of the parts shown in Fig. 15 looking from the left; Fig. 17 is a vertical cross sectional view taken on the line 17—17 of Fig. 15; Fig. 18 is a horizontal cross sectional view taken on the line 18—18 of Fig. 15; Fig. 19 is a detail perspective view of one of the paper guiding fingers with its operating mechanism; Fig. 20 is a detail perspective view of the carton ejecting mechanism and spinner driving cam; Fig. 21 is a detail view showing the carton being held by the safety latch in its ejected position; Fig. 22 is a detail view of the paper guiding racks showing the position they assume while gluing; Fig. 23 is an enlarged detail view showing the mandrel incased in the winding and ejecting sleeve, and also showing the spinner; Fig. 24 is a horizontal cross sectional view of the parts shown in Fig. 23 with a carton and bottom inserted therein ready for spinning; Fig. 25 is an end view of the mandrel, and winding and ejecting sleeve, and showing the mandrel and forming plate removed; Fig. 26 is a cross sectional view taken on the line 26—26 of Fig. 24; Fig. 27 is a side elevational view of one of the wedge guides; Fig. 28 is an end elevational view of one of the wedge guides; Fig. 29 is a detail view of the spinner; Fig. 30 is a detail view of the mandrel and forming plate; Fig. 31 is a detail plan view of the mandrel expanding and contracting cams; Fig. 32 is a side elevational view of the parts shown in Fig. 31; Fig. 33 is a detail sectional view taken on the line 33—33 of Fig. 32; Fig. 34 is a diagrammatic view showing the working of the complete machine; Fig. 35 is a detail view showing a convolutely wound carton; Fig. 36 is a detail sectional view of a carton showing a bottom inserted therein; Fig. 37 is a detail sectional view of a carton showing a finished bottom formed thereon; and, Fig. 38 is a perspective view of a finished carton.

The general operation of this machine may be understood from the diagrammatic view shown in Fig. 34 in which paper from the roll 36 is first severed into suitable lengths to form a convolutely wound carton, while a suitable legend is printed by the means 47 on the paper before it is wound and in the right position for it to appear at the proper place on the outside of the finished article. The printed strips of paper are next supplied with glue and wound as at A into tubes, which are transferred to the point B, then to position C, then to position D, where a suitable mechanism punches out and forms bottom closures from the paper carried by roll 155 and inserts these closures in the ends of the tubes. The tubes with the closures in place, are next transferred to position E where the closures and tube are subjected to a spinning operation to firmly fix the closures in the tube, and the finished cartons are finally ejected from the machine at F. These various mechanisms will now be described in detail, and their relations one with the other will also be pointed out.

In order to make clear the exact relation of the tube closing mechanism to the tube forming mechanism the latter will be described first.

Referring to Fig. 2, power may be supplied by any suitable means as by a belt to the pulley 8, mounted on the shaft 7, carrying the pinion 6, meshing with the gear 5, mounted on the shaft 4, carrying the pinion 3, meshing with the gear 2, carried by the main power shaft 1, which latter distributes power to the various parts of the machine. The shaft 1 also carries the intermittent gear 9, meshing with the intermittent gear 10, mounted on the shaft 11, carrying the bevel gear 12, meshing with the bevel gear 13, carried by the shaft 14, which operates the press for forming the bottom closures, as will appear more fully below. On the end of the shaft 1 opposite to that carrying the gear 2, is the gear 15, see Fig. 3. This gear meshes with the gear 16, and through the same operates a Geneva mechanism performing an operation and of a construction to be more fully described below, and said gear 16, through the shaft 17, operates a bevel gear 18, meshing with the bevel gear 19, carried by one end of the shaft 20.

The shaft 20 extends the entire length of the machine, see Figs. 1 and 3, and has on its other end the bevel gear 21, meshing with the bevel gear 22 mounted on the shaft 23, which latter shaft distributes power to the printing, cutting and paper feeding mechanism, as shown in Figs. 1 and 5, and now to be described. Mounted on said shaft 23 is the intermittent gear 24 meshing with the intermittent gear 25, mounted on the shaft 26, carrying the gear 27 meshing with the idler gear 30, driving the gear 28 on the shaft 31 and meshing with the gear 29 on the shaft 32. Carried by the shaft 31 is the paper feed roll 33, and carried by the shaft 32 is the feed roll 34, Figs. 5 and 9, while paper from the roll 36, carried by the bracket 37, is forced by said rolls into position to be cut into suitable lengths and to have a suitable legend printed thereon by mechanism, as will now appear. A screw tensioning means 35 for adjusting the feed roll 34 is provided, as shown in said figures; while the mechanism for cutting the strips of paper 36 into suitable lengths is operated by the intermittent gear 38, also mounted on the shaft 23, which drives the small intermittent gear 39 mounted on the stud 40 which likewise carries the gear 41 meshing with the gear 42, mounted on the outer end of shaft 43, see Figs. 1 and 5. In order that the operation of printing on the tube may be inexpensively carried out, the tube forming mechanism is provided with a printing means as will now appear. Carried on the inner end of the shaft 43 is a disk 44 which is provided with a crank pin 45. This crank pin, Figs. 5, 9 and 10, through the connecting rod 46 reciprocates the printing frame 47. The said printing frame 47 is preferably of the shape and construction shown in Figs. 9, 10, 11, 12 and 13, and slides to and from the paper 36 between the guides 48, which are mounted on the cross frame 49 held to the sides of the machine. Secured to the under side of the printing frame 47 and held thereto by four equalizing studs 50, and by clamping slides 51, Fig. 14, is the electrotype holder 52. These equalizing studs 50, mounted within the sliding printing frame 47 are provided on their lower ends with reduced portions 53 and with heads 54, and at their upper ends with the adjusting nuts 55. The electrotype holder 52 has mounted on its under side the electrotype 56 and also accommodates therein the said slides 51. When it is desired to remove or change the electrotype holder, it is only necessary to pull out the slides 51 until the enlarged holes 57, at the end of the slots 58, register with the heads 54 of the equalizing studs 50. Likewise, carried by the shaft 23 and opposite the driving gears is a cam 59 for driving the inking mechanism associated with the printing frame 47, which will now be described, see Figs. 5, 9, and 10. The cam 59 oscillates the lever 60 mounted on the shaft 61, which is supported by the bearings 63, Fig. 5, on the side frame of the machine. This shaft also has mounted thereon the pair of operating levers 62. The outer ends of these levers 62 are slotted to engage the rollers 630, mounted on the ink roll levers 64, Figs. 5, 9 and 10. These latter levers are mounted on the studs 65 in the sides of the machine and carry in slots 66 the ink rolls 67, see Figs. 9 and 10. Springs 68 mounted on the ink roll levers 64 hold the ink rolls, when in different positions, respectively against the type 56 and inking plate 74. Extending down from the cross frame 49 is a web 69, Fig. 10, to which is pivotally mounted as at 70 a rocking lever 71 carrying a spring pressed pawl 72 which contacts with a ratchet 73 on the revolving inking plate or disk 74 which is pivotally mounted on the cross frame 49 as at 740. This spring pressed pawl is for operating the revolving ink disk 74 when the rocking lever 71 is engaged at its outer end by the pin 75 mounted on the ink roll lever 64, and while said pin is performing its downward stroke, Figs. 5, 9, and 10. The rocking lever 71 is returned, see Fig. 10, by a spring 76 until it comes into contact with the stop pin 77 mounted on said web 69, rigid with the cross frame 49, and thereby reëngages the ratchet 73 of the plate 74.

In order that the strips of paper 36 to be printed upon by the mechanism just described, may be automatically cut into suitable lengths, as they are unwound from the roll, the following mechanism is provided:— The disk 44 in addition to carrying the crank pin 45, is provided with the cam slot 78 in which operates a roller 79 mounted on one end of the bell crank lever 80 which lever rocks on the stud 81, mounted in a bearing 82 on the cross frame 49. Running in a slot 83, on the opposite or forked end 84 of the bell crank lever, see Figs. 5, 9 and 10, are studs 85 which are mounted in the upper end of the cutting frame 86. At the lower end of this cutting frame 86 is held the knife blade 87 for shearing the paper 36 against the lower knife blades 88 on the frame of the machine, see Figs. 9 and 10. Said cutting frames 86 travel to and from the paper between the cross frame 49 and the guide bars 89 mounted on the side of the machine, and the parts are so timed that the shearing of the paper takes place immediately following the type impression. The feeding of the paper by means of the rolls 33 and 34 is also so adjusted and timed that a length just sufficient when wound to form the desired tube is severed at each operation. Further, the printing frame is so located relatively to the paper that the portion of the severed strip which will later form the outside of the finished tube, receives the printed impression.

Immediately after the type leaves the paper, the gluing and winding mechanism, now to be described, is brought into operation.

Carried by the shaft 20 which, as above stated, runs the entire length of the machine, are two cams 90 and 91, Figs. 1, 15 and 16, and these cams operate respectively the gluing and winding rolls 92 and 93. The operating mechanism of these two rolls is the same, except the winding cam 91, Fig. 16, has a longer dwell, as will be more fully hereinafter disclosed.

94 and 95 indicate cam following levers for the gluing and winding mechanism pivotally mounted on brackets 96 and 97 held to the frame of the machine, Figs. 15 and 16. These levers have pivotally mounted on their inner end bearings 98 and 99, Figs. 15 and 16, yoke bars 100 and 101 which yoke bars carry at their outer ends connecting rods 102 and 103. These connecting rods are pivotally connected at their upper ends to the toggles 104 and 105. Each of the toggles 104 and 105, are pivotally connected at one end to the side frame of the machine by a stud 106, and are also pivotally mounted on the shafts 107 and 108 of the gluing and winding rolls 92 and 93, respectively. These shafts also operate in slots 109 in the side frames of the machine, see Figs. 1 and 15.

It will be clear from the foregoing that through the operation of the cam following levers 94 and 95 on the cams, the rolls 92 and 93 through the toggles and connecting rods are brought to the dotted or operating position shown in Fig. 15. The return movement of these rolls and their connecting parts is brought about by the springs 111 and 112 connected to the cam following levers 94 and 95 and the frame of the machine, as shown.

When the gluing roll 92 is moved forwardly and downwardly into its dotted line operative position, it causes the paper to be pressed against the glue covered surface of the roll 113 mounted on a shaft within the glue pot 114. This roll 113 is revolved by its frictional contact with the paper as it is moved by the rolls, and the glue is evenly distributed on the under side of the said paper as long as roll 92 is in its operative position. The rotating movement of the roll 113 keeps its surface covered with a thin film of glue the thickness of which is controlled by the knife edge 115 mounted on the glue pot 114.

The paper guide 116, Figs. 15, 16, 17, 18 and 19, for keeping the paper in proper alinement after it leaves the feed rolls 33 and 34, has pivotally mounted on its under side and directly beneath the gluing roll 92, a pair of guide fingers 117, which fingers are for the purpose of guiding and supporting the paper between the rolls 92 and 113 where it would be otherwise unsupported, when the gluing roll 92 is in its upper or idle position. This paper guide 116 is also provided with elongated openings 1160, see Fig. 18, through which the enlarged sections of the gluing roll 92 are adapted to pass. These guide fingers 117 are pivotally connected as at 118 through the rod 119 and lever 120, to the connecting rod 102, which operates the gluing roll 92. They are accordingly operated by said rod to lift the paper when the gluing roll is returning to its idle position. The fingers 117 also serve, when in the position indicated in Fig. 15, to guide a fresh portion of the paper above the glued surface of the roll 113.

The means for supporting the paper between the gluing and winding positions will now be described. This means comprises a series of stationary bars 121, movable bars 122 and connected parts for taking care of both the clean and glued parts of the paper during travel through the paper guide 116 to the winding roll and mandrel, see Figs. 1, 15, 17, 18 and 22. The stationary bars 121 are rigidly held on shafts 123 mounted in the side frames of the machine. The movable bars 122 are supported on shafts 1220 which are in turn pivotally mounted by links 124 at 125 to the side frames of the machine. One of the shafts 1220 is extended, at each side, beyond the frame of the machine and is engaged by the slots 126 in the levers 127 at their upper ends. These levers 127 are mounted on the shaft 128 which is supported in the side frames of the machine and are operated through the lever 130 by the cam 129, which cam is mounted on the power distributing shaft 20, see Figs. 1, 15, 16 and 22.

The parts are so timed that only a portion of the paper strip is depressed by the roll 92 into contact with the gluing roll 113, and therefore, said strip is provided with clean and glued portions, as above indicated.

In the operation of the machine and immediately before the period of gluing, the cam 129 through the levers 130 and 127 causes the movable bars 122 to drop below the stationary bars 121 and from the full line positions shown in Figs. 15 and 17, to the dotted line position shown in Fig. 22, thus the movable bars 122 which supported the clean or unglued parts of the paper, are now held below the stationary bars 121 and kept free from glue while the glued portion of the paper travels along the stationary bars 121 after it has left the glue covered rolls 113. The upper edges of these stationary bars are sharpened to prevent them from holding any material quantity of the glue after the glued end of the paper has left the stationary bars. The timing of the parts is also such that when a clean portion of the paper has reached the gluing rolls, the movable bars are returned to their upper position through the cam 129 and its driving mechanism.

So far as has now been disclosed, it will be clear from the foregoing that paper is fed from the roll 36 by the feed rolls 33 and 34 through the guide 116 up to the point X into contact with the mandrel 138 before any glue is applied thereto. It further receives a suitable impression from the printing mechanism 47, whereupon a suitable length of paper for making the required tube is then severed by the knife 87. At the same time, that portion of the paper strip beneath the roll 92, is brought into contact with the glue roll 113, and receives a sufficient quantity of glue, when said glued portion is passed on to the winding rolls 93 and 138 to be wound in a tube.

The mechanism for winding the glue coated strip into a tube and for putting a bottom into the same, will now be more fully disclosed.

Mounted at the right hand side of the machine on the end of the shaft 17, Fig. 3, the drive of which through the gear 16, has been previously described, is the Geneva mechanism already referred to. This mechanism comprises a crank 132, Fig. 1, carrying on its outer end a roller 133, which roller contacts intermittently with the Geneva wheel 134 mounted on the shaft 135. Mounted also on the shaft 17 is the locking disk 136, Figs. 1 and 3, for locking intermittently the Geneva wheel. This mechanism is mounted in a suitable bracket 1360, Figs. 3 and 4, in the frame of the machine. The shaft 135 also has rigidly mounted thereon a spider 137 for supporting and carrying six mandrels 138, Figs. 1, 3 and 4, arranged sixty degrees apart. These mandrels are expandible, Figs. 23, 24, 25 and 26, and are exactly the same in detail, construction and operation as those previously described in my former application Serial No. 564,602; filed June 2, 1910; and entitled Crimping machine for cartons.

Mounted on each side of the expanding mandrels 138 and securely bolted to the spider 137, Figs. 3, 4, 31 and 32 are two guide rods 139 which guide rods are for the purpose of supporting a sliding frame 140, which frame comprises a winding sleeve 141 and ejecting collar 142, Figs. 3, 25 and 26.

143 indicates a forming disk, see Figs. 24 and 30, securely held to the outer wedge guide of the mandrel, the purpose of which will be hereinafter described.

Considering now one of the mandrels being held by the Geneva mechanism in its winding position, as shown in Figs. 1, 3, 4 and 15, it will be seen that the toggle mechanism 105, Fig. 15, will force the roll 93 forward and downwardly into its dotted line operative or paper feeding position, and will therefore, when rotated in the manner to be described, cause, in connection with a mandrel 138, the glued strip of paper to be fed forward between the outer surface of the said mandrel 138 and the inner surface of the surrounding sleeve 141.

Each of the mandrels are further provided with a gear 144, Figs. 1, 3 and 4, which, as the spider revolves, contacts with the friction roll of yielding material 146, Figs. 4 and 16, rigid with the winding roll 93, and is revolved for the purpose of winding the paper. This winding roll carrying the friction roller gear 146 is driven by the sprocket wheel 147 mounted on the winding roll shaft 108 through the chain 148 by the sprocket wheel 149, which sprocket together with the bevel gear 150, is mounted on the stud 151. The bevel gear 150 is driven by bevel gear 152 mounted on the power distributing shaft 20. Therefore, when the paper has been fed to the point X, Figs. 15 and 22, the winding roll 93 being brought to its winding position previously described, will through its rotary motion, force the paper and cause it to be guided around the mandrel within sleeve 141. To aid in this operation, the sleeve 141 is provided with an opening 153 to permit the winding roll to contact with the mandrel, see Fig. 15.

To prevent the paper from taking an improper path in its winding position, two lips 154, Fig. 20, are provided on the sleeve 141, which lips extend within the recesses 930 on the winding roll 93.

It will now be clear from the foregoing, that as the mandrels 138 are brought into the position A, Fig. 1, the winding roll 93 will be moved down into its dotted line position, Fig. 15, into contact with the glue coated paper and said mandrel, while the friction roll 146 will contact with the gear 144 and rotate said mandrel on its axis, and thereby wind up said glued paper strip into a tube. The tube being formed the Geneva mechanism will move the mandrel and tube to the position B where it may be subjected to heat for the purpose of drying and setting the adhesive, which heat may be supplied by a blast of hot air or by gas burners, as in my said application above, and if desired, this drying may be continued at the position C, which the mandrel next assumes, as it is intermittently revolved by the spider under the influence of the Geneva wheel. The foregoing tube forming mechanism as will now appear also constitutes a portion of the tube closing mechanism. That is to say the carton and mandrel is next brought to the position D, Fig. 1, where the bottom is formed and inserted into the tube, as will now be described.

The mechanism for forming the bottom is situated in suitable framework on the left hand side of the machine, and comprises the feeding mechanism for the paper out of which the bottom is formed, and the blanking and bottom forming mechanism. 155 indicates the bottom paper roll, Fig. 2, supported on the bracket 156, the paper from which is fed through paper guide 157, Fig. 7, by the feed rolls 158 and 159, which rolls are operated intermittently through suitable spur gears 160, 161 and 162, and bevel gears 163 and 164, which bevel gear 164 is mounted on the mandrel spider shaft 135, see Figs. 1, 2, 4 and 7. A screw tensioning means 165 for adjusting the feed roll 158 is provided, as shown in Fig. 7.

The bottom blanking and forming mechanism comprises the blanking punch 166, Figs. 6, 7 and 8, operated through connecting rods 167 by eccentrics 168 and the forming punch 169 operated through the connecting rod 170 by the crank 171. The eccentrics 168 are integral with the vertical shaft 14, Fig. 2, previously mentioned, and are so arranged that the blanking punch 166 cuts out blanks in the form of paper disks at the cutting edge 172 of the blanking die 173, see Figs. 7 and 8. The crank 171 is also integral with and so arranged on the vertical shaft 14 that the forming punch 169 follows within the blanking punch carrying the paper disk on through the forming die 174 and into the carton 300, as shown in Fig. 8.

The connecting rod 170 is adjustable, as shown, for regulating the movement of the forming punch and a means is also provided for regulating the time of the blanking, consisting of the nut 175, which lengthens or shortens the operation of the blanking punch 166. When the proper adjustment of the blanking punch is obtained, it is held in a locked position by the bolt 176.

The blanking punch frame slides within the guides 177 in the framework of the machine.

From the mechanism so far disclosed, it will be clear that the paper strips 36 which were automatically cut into suitable lengths, subjected to a printing operation, furnished with an adhesive, rolled into a tube, and subjected to a drying operation, are brought opposite the bottom forming means at the point D, and there a flanged cup shaped disk 1430, Figs. 24 and 36, forced into said formed tube. The Geneva wheel next rotates the mandrel and tube with its closure in place to the position E, Fig. 1, at which point the flange of the disk closure and the edge of the tube are subjected to a spinning operation for the purpose of firmly and tightly securing the closure in place, as will now be disclosed.

Mounted on the stud 178 is a small spur gear 179 which meshes with and is driven by the spur gear 5, Figs. 2 and 4. 180 indicates a bevel gear also mounted on the stud 178 which meshes with a bevel gear 181 on the lower end of the diagonal shaft 182. This shaft has mounted on its upper end a bevel gear 183 which meshes with and drives the bevel gear 184 on the outer end of the shaft 185. Mounted on the inner end of this shaft 185 is a spur gear 186 which meshes with a spur gear 187 mounted on the outer end of the idler shaft 188. On the inner end of this idler shaft is a spur gear 189 which meshes with a wide spur gear 190 mounted on the inner end of the spinner shaft 191 directly behind the spinner disk 192, see Figs. 3, 4, 6 and 29. This spinner shaft is slidably mounted within the frame of the machine and its outer or cam follower end is held against a cam 193 on the shaft 14, by the spring 194. The spinner disk 192 is projected forward into contact with the tube and closure through the cam 193 at its proper time for spinning.

The details of the spinning mechanism are not disclosed herein, but they will be clear from my prior application above. Suffice it to say, the disk 192 is preferably provided with perforations 1920, Fig. 29, which serve to roughen or break down the edges of the tube and closure, and when it rotates, it is forced longitudinally of its shaft and the tube so that the said edges are curled inward and spun together in such a manner as to make an exceedingly strong and liquid tight joint, Fig. 37.

The carton 300 being finished, it moves to the position F, Fig. 1, where it is automatically ejected from the machine by the means now to be disclosed, especial reference being had to Figs. 1, 2, 3 and 4. In this position the notched ejector slide 195, traveling on the rod 196, supported on the frame of the machine, engages the ejecting collars 142, see Figs. 3, 4, 20 and 21. Through the connecting rod 197 pivotally connected to the crank 198 mounted on the end of the vertical press shaft 14 the ejector slide moves along the rod 196 and carries the carton off the mandrel into the receptacle 199. When the carton 300 has entered the receptacle 199, it is held by the finger 200 from following the ejector slide back on the mandrel during its return stroke, see Fig. 21. The lever 201 which carries on its inner end the finger 200 is pivotally mounted at 202 to the side of the receptacle 199 and is operated by the cam 203 on the rotating press shaft 14.

After a finished carton is delivered into the receptacle 199, the succeeding one forces out its predecessor, and the said cartons thereafter may be caught in any suitable receiver, not shown.

In the foregoing description the tubes are tightly wound around the mandrels and they must be firmly held thereon during the crimping operation. On the other hand, they must be capable of easy stripping from the mandrels when they are finished. To aid in the stripping operation, the mandrels are made of an expanding and contracting type, as will be clear from Figs. 24, 25 and 26, their construction being practically the same as those disclosed in my prior application above, and they are expanded during the making of the carton and contracted after the crimping operation by means of mechanism substantially the same as that disclosed in said prior application. That is to say, during the rotation of the spider 137 the expansion and contraction of the mandrels is accomplished by the expanding cam 204 and contracting cam 205 supported on the stationary wheel 206, see Figs. 3, 4, 31 and 32. These cams are rigid with the wheel 206, and the latter is mounted on the frame of the machine. The mandrel shaft $x$ carrying the mandrel in traveling from the spinning position E to the ejecting position F follows along the path of cam 205, is moved longitudinally permitting its cams to disengage its wedge expanding members comprising the wedges 330 and holders 331, Figs. 24, 27 and 28, and thereby allows the springs 332 to contract the mandrel, all as is disclosed in said prior application. In traveling from the ejecting position F back to the winding position A, the mandrel shaft $x$ follows along the cam 204 thereby partly expanding the mandrel again just before the tube is formed. In traveling from the position A to the idle or drying position B, the shaft $x$ continues to follow the cam 204 when the mandrel becomes completely expanded and stays expanded through the further idle or drying positions C, punching and forming position D, and spinning position E. A spring actuated segment 207 is mounted on the stationary wheel 206 opposite the spinning position, in order to render the operation more smooth and certain.

The operation of the machine will be clear from the foregoing, but may be briefly summarized as follows:—Paper for forming the body of a carton is fed from the paper roll 36 by the feed rolls 33 and 34 through the paper guide 116 until it reaches the winding position A. Through intermittent gears 24 and 25, and other mechanism, the paper feed is so timed that it reaches the said position A immediately after one of the mandrels reaches the same point. Through intermittent gears 38 and 39 the printing mechanism is caused to imprint a legend on the paper immediately after it comes to a stop and at a point which will make it appear in the desired position on the outside of the finished carton 300, Fig. 38. As soon as the electrotype leaves the paper, the knife 87 through the cam 44 and its operating mechanism cuts the paper into a predetermined length which (see Fig. 34) is sufficient to convolutely wind the carton 300 to a desired thickness, see Fig. 35. After the movement of the knife 87, the cam 59 and its connecting mechanism causes the ink rolls 67 to travel over the ink plate 74, Fig. 10, thereby taking up ink, and later the said ink rolls 67 are carried to the electrotype and caused to spread ink thereover, Fig. 9. Simultaneously with the operation of printing and cutting, the roll 92 and winding roll 93 are brought into their operative positions to spread an adhesive on and to wind the strip, as has been previously described. The friction gear 146 on the shaft 108 revolving through its chain drive from the shaft 20 engages the gear 144 on a mandrel and rotates the latter a sufficient amount to wind the glued strip into a tube. The degree of rotation is governed by the lifting portion of the cam 91, see Fig. 16. The roll 93 also mounted on the shaft 108, in revolving pulls the paper from the glue roll 113 thus spreading the glue on all of the paper except the first complete turn, which in length is equal to a complete circumference of the carton to be made. The paper is chosen of a length such that when wound over the mandrel, a sufficient number of revolutions, the walls of the carton will have the required thickness. To prevent glue from getting on that part of the paper which is not to be glued and thus gumming up the mandrel, the movable bars 122 support the unglued portion and the stationary bars 121 support the glued portion of said paper.

After the carton has been wound on the partially expanded mandrel in the position A, it is then brought by means of the Geneva wheel 134, to one drying position B, during which travel the said mandrel is expanded to its utmost, thereby holding the finished tube under pressure between the mandrel 138 and the sleeve 141. The mandrel containing the carton is then brought to a second drying position C by the Geneva wheel, and then to the bottom forming and punching position D, where the bottom from the paper roll 155 is blanked, formed and inserted into the tube. After leaving this position, it is then brought to the spinning position E where the bottom is firmly secured to the tube and preferably given by means of the member 1430, Fig. 24, the form shown in Fig. 37. The mandrel in passing from spinning position E to the ejecting position F is contracted by means of the cam 205, thus allowing the carton to be readily forced off the mandrel by the ejector means 142 and 195, Fig. 20. The Geneva mechanism causes all the mandrels to be brought to their various operating positions successively and to be locked in place while the operations are being performed.

It will be observed from the foregoing that the operation of the machine is such as to never lose control of the paper at any stage whatever. The paper starts into the machine under the firm control of the feeding rolls, it is forced into and out of contact with the glue applying roll, it is forced into the grip of the winding mandrel; the latter expands and grips the tube firmly while the bottom is being applied, it is forced off the mandrel, and is forcibly prevented from returning. The result is a machine, nothing being left to chance, in which every operation goes on with great rapidity and certainty.

It is obvious that those skilled in the art may vary the details of construction as well as the arrangement of parts without departing from the spirit of my invention, and therefore I do not wish to be limited to such features, except as may be required by the claims.

What I claim is:—

1. In a paper tube machine, the combination of a plurality of mandrels; means for revolving said mandrels at predetermined intervals along a circular path; means for feeding, cutting, printing and gluing strips of paper and forcing them successively to said mandrels; means for correspondingly causing said mandrels to wind said paper into tubes and causing said printing to appear on the outside of said tube; and means located in said path for inserting a bottom in said tube, substantially as described.

2. In a paper tube machine, the combination of a plurality of mandrels; means for moving said mandrels to, and locking them in predetermined positions; means for successively feeding prepared paper strips to said mandrels when in one position; means for rotating said mandrels on their axes and winding said strips into tubes while in said positions; and means for forming and forcing end closures into said tubes when said mandrels reach another position, substantially as described.

3. In a paper tube machine, the combination of a plurality of mandrels; means for moving said mandrels to, and locking them in predetermined positions; means comprising a movable roll for successively feeding prepared paper strips to said mandrels when in one position; means rigid with said roll for rotating said mandrels on their axes and winding said strips into tubes while in said positions; and means for forming and forcing end closures into said tubes when said mandrels reach another position, substantially as described.

4. In a paper tube machine, the combination of a plurality of mandrels; means for moving said mandrels to, and locking them in predetermined positions; means for successively feeding prepared paper strips to said mandrels when in one position; means for rotating said mandrels on their axes and winding said strips into tubes while in said positions; means for forming and forcing end closures into said tubes when said mandrels reach another position; and means for subjecting said tubes and closures to a spinning operation when said mandrels reach a still further position, substantially as described.

5. In a paper tube machine, the combination of a plurality of mandrels; means for moving said mandrels to, and locking them in predetermined positions; means comprising a movable roll for successively feeding prepared paper strips to said mandrels when in one position; means rigid with said roll for rotating said mandrels on their axes and winding said strips into tubes while in said positions; means for forming and forcing end closures into said tubes when said mandrels reach another position; and means for subjecting said tubes and closures to a spinning operation when said mandrels reach a still further position, substantially as described.

6. In a paper tube machine, the combination of a plurality of mandrels; means for successively moving said mandrels to predetermined positions at predetermined intervals; means for feeding to each mandrel when in one position a previously prepared strip; means for causing said mandrel to form said strip into a tube while in said position; means for forming and inserting a closure into said tube when said mandrel is in another position; means for permanently securing said closure in said tube when said mandrel reaches a further position; and means for ejecting said tube from said mandrel when the latter reaches a still further position, substantially as described.

7. In a paper tube machine, the combination of a plurality of mandrels; means for successively moving said mandrels to predetermined positions at predetermined intervals; means comprising a movable roll for feeding to each mandrel when in one position a previously prepared strip; means rigid with said feeding means for causing said mandrel to form said strip into a tube while in said position; means for forming and inserting a closure into said tube when said mandrel is in another position; means for permanently securing said closure in said tube when said mandrel reaches a further position; and means for ejecting said tube from said mandrel when the latter reaches a still further position, substantially as described.

8. In a paper tube machine, the combination of a plurality of mandrels; means for successively moving said mandrels to predetermined positions at predetermined intervals; means comprising a movable roll for feeding to each mandrel when in one position a previously prepared strip; means rigid with said feeding means for causing said mandrel to form said strip into a tube while in said position; means comprising a punch and forming die for forming and inserting a closure into said tube when said mandrel is in another position; means for permanently securing said closure in said tube when said mandrel reaches a further position; and means for ejecting said tube from said mandrel when the latter reaches a still further position, substantially as described.

9. In a paper tube machine, the combination of a plurality of mandrels; means for successively moving said mandrels to predetermined positions at predetermined intervals; means comprising a movable roll for feeding to each mandrel when in one position a previously prepared strip; means rigid with said feeding means for causing said mandrel to form said strip into a tube while in said position; means comprising a punch and forming die for forming and inserting a closure into said tube when said mandrel is in another position; means comprising a spinning disk for permanently securing said closure in said tube when said mandrel reaches a further position; and means for ejecting said tube from said mandrel when the latter reaches a still further position, substantially as described.

10. In a paper tube machine, the combination of a shaft; means carried by said shaft for supporting a plurality of mandrels; a plurality of mandrels disposed on axes parallel to each other and to said shaft; means for successively rotatively moving said supporting means and mandrels to predetermined positions at predetermined intervals; means for feeding in a direction at right angles to the axis of each mandrel when in one position a previously prepared strip; means for causing said mandrel to form said strip into a tube while in said position; means for forming and inserting a closure into said tube when said mandrel is in another position; means for permanently securing said closure in said tube when said mandrel reaches a further position; and means comprising a movable collar and sliding frame for ejecting said tube from said mandrel when the latter reaches a still further position, substantially as described.

11. In a paper tube machine, the combination of a plurality of mandrels; means for successively moving said mandrels to predetermined positions at predetermined intervals; means for feeding to each mandrel when in one position a previously prepared strip; means for causing said mandrel to form said strip into a tube while in said position; means for forming and inserting a closure into said tube when said mandrel is in another position; means for permanently securing said closure in said tube when said mandrel reaches a further position; means for ejecting said tube from said mandrel when the latter reaches a still further position; and means for preventing the said tube from returning to said mandrel after it has been removed therefrom, substantially as described.

12. In a paper tube machine, the combination of a plurality of expansible mandrels; means for successively moving said mandrels to predetermined positions at predetermined intervals; means for feeding to each mandrel when in one position a previously prepared strip; means for partially expanding said mandrel before it reaches said position; means for causing said mandrel to form said strip into a tube while in said position; means for forming and inserting a closure into said tube when said mandrel is in another position; means for permanently securing said closure in said tube when said mandrel reaches a further position; means for contracting said mandrel; and means for ejecting said tube from said mandrel when the latter reaches a still further position, substantially as described.

13. In a paper tube machine, the combination of a plurality of expansible mandrels; means for successively moving said mandrels to predetermined positions at predetermined intervals; means comprising a movable roll for feeding to each mandrel when in one position a previously prepared strip; means for partially expanding said mandrel before it reaches said position; means rigid with said feeding means for causing said mandrel to form said strip into a tube while in said position; means for forming and inserting a closure into said tube when said mandrel is in another position; means for permanently securing said closure in said tube when said mandrel reaches a further position; means for contracting said mandrel; and means for ejecting said tube from said mandrel when the latter reaches a still further position, substantially as described.

14. In a paper tube machine, the combination of a plurality of expansible mandrels; means for successively moving said mandrels to predetermined positions at predetermined intervals; means comprising a movable roll for feeding to each mandrel when in one position a previously prepared strip; means for partially expanding said mandrel before it reaches said position; means rigid with said feeding means for causing said mandrel to form said strip into a tube while in said position; means comprising a punch and forming die for forming and inserting a closure into said tube when said mandrel is in another position; means comprising a spinning disk for permanently securing said closure in said tube when said mandrel reaches a further position; means for contracting said mandrel; and means for rejecting said tube from said mandrel when the latter reaches a still further position, substantially as described.

15. In a paper tube machine, the combination of a plurality of expansible mandrels; means for successively moving said mandrels to predetermined positions at predetermined intervals; means comprising a movable roll for feeding to each mandrel when in one position a previously prepared strip; means for partially expanding said mandrel before it reaches said position; means for causing said mandrel to form said strip into a tube while in said position; means for further expanding said mandrel; means comprising a punch and forming die for forming and inserting a closure into said tube when said mandrel is in another position; means comprising a spinning disk for permanently securing said closure in said tube when said mandrel reaches a further position; means for contracting said mandrel; and means for ejecting said tube from said mandrel when the latter reaches a still further position, substantially as described.

16. In a paper tube machine, the combination of a plurality of mandrels having axes parallel to each other; means for moving the same successively to different positions; means for rotating and causing each mandrel to form a paper tube when in one position; means comprising a cutting die and a forming die for cutting blanks, forming them into closures and inserting the latter into said tubes when each mandrel is in another position; and means comprising a bodily movable perforated spinning disk for uniting said closures and tubes when said mandrels reach a further position, substantially as described.

17. In a paper tube machine, the combination of a plurality of mandrels having axes parallel to each other; means for moving the same successively to different positions; means for rotating and causing each mandrel to form a paper tube when in one position; means comprising a cutting die and a forming die for cutting blanks, forming them into closures and inserting the latter into said tubes when each mandrel is in another position; means comprising a bodily movable perforated spinning disk for uniting said closures and tubes when said mandrels reach a further position; and means comprising a sliding collar carried by said mandrel and a sliding frame adapted to forcibly remove said tubes from said mandrels when they reach a still further position, substantially as described.

18. In a paper tube machine, the combination of a power pulley, a main power shaft; gear connections between said pulley and shaft; an intermittent gear carried by said shaft; a second shaft; an intermittent gear meshing with said first mentioned gear carried by said second shaft; a plurality of mandrels adapted to carry cartons; a sliding frame comprising a crank arm, a connecting bar and a notched sleeve adapted to strip said carton from said mandrels; and gear connections between said sliding frame and said second shaft, substantially as described.

19. In a paper tube machine, the combination of a power pulley; a main power shaft; gear connections between said pulley and shaft; an intermittent gear carried by said shaft; a second shaft; an intermittent gear meshing with said first mentioned gear carried by said second shaft; a plurality of mandrels adapted to carry cartons; a cam on said second shaft; a spring controlled spinner shaft adapted to be operated by said cam; and a spinning disk adapted to operate on said cartons carried by said spinner shaft, substantially as described.

20. In a paper tube machine, the combination of a power pulley; a main shaft; gear connections between said pulley and shaft; a plurality of mandrels adapted to carry cartons; a spur gear carried by said shaft; a second shaft; a second spur gear meshing with said first spur gear carried by said second shaft; a third shaft on which said mandrels are mounted; a Geneva wheel on said third shaft; an arm carried by said third shaft for operating said Geneva wheel; and means associated with said mandrels for forming tubes thereon, substantially as described.

21. In a paper tube machine, the combination of a power pulley; a main power shaft; gear connections between said pulley and shaft; a plurality of mandrels adapted to carry cartons; a spur gear carried by said shaft; a second shaft; a second spur gear meshing with said first spur gear carried by said second shaft; a third shaft carrying said mandrels; connections between said second and third shafts; a paper feed roll associated with said mandrels; and means for successively contacting with each mandrel to operate the same, substantially as described.

22. In a paper tube machine, the combination of a power pulley, a shaft; connections between said pulley and shaft; a second shaft; bevel gear connections between said first and second shafts; a third shaft; bevel connections between said second and third shafts; a plurality of mandrels adapted to carry cartons; a spinning means adapted to operate on said cartons; connections between said pulley and mandrels; and connections between said third shaft and said spinning disk, substantially as described.

23. In a paper tube machine, the combination of a plurality of mandrels adapted to carry cartons; means for intermittently rotating said mandrels and cartons to predetermined positions and locking the same in said positions; a casing into register with which said mandrels and cartons are successively brought when occupying one of said positions; a reciprocating slide adapted to force said cartons from said mandrels and into said casing when opposite said casing; means for preventing the removed carton from leaving said casing after having entered the same; and means for operating said slide, substantially as described.

24. In a paper tube machine, the combination of a plurality of mandrels adapted to carry cartons; means for intermittently rotating said mandrels and cartons to predetermined positions; a casing adapted to receive said cartons into register with which said mandrels are adapted to register when occupying one of said positions; means comprising a slide for forcing said cartons successively into said casing; a rotating shaft and connections for operating said slide; a cam carried by said shaft; and a pivoted lever coacting with said cam and casing adapted to prevent said cartons from being withdrawn from said casing after having entered the same, substantially as described.

In testimony whereof, I affix my signature, in presence of two witnesses.

GEORGE W. BEADLE.

Witnesses:
J. H. GEWECKE,
H. S. RODGERS.